United States Patent [19]

Matsumoto et al.

[11] Patent Number: 4,722,618
[45] Date of Patent: Feb. 2, 1988

[54] CENTER BEARING SUPPORTING DEVICE FOR PROPELLER SHAFT

[75] Inventors: Shuji Matsumoto, Atsugi; Takashi Tsutsumi, Hiratsuka, both of Japan

[73] Assignee: Nissan Motor Co., Ltd., Yokohama, Japan

[21] Appl. No.: 909,228

[22] Filed: Sep. 19, 1986

[30] Foreign Application Priority Data

Sep. 21, 1985 [JP] Japan .............................. 60-143531[U]

[51] Int. Cl.⁴ .............................................. F16C 27/06
[52] U.S. Cl. ..................................... 384/536; 384/535
[58] Field of Search ............... 384/476, 535, 536, 581, 384/582, 611, 620, 904, 196, 198, 200, 202, 215, 220, 222, 231, 235

[56] References Cited

U.S. PATENT DOCUMENTS

| | | | |
|---|---|---|---|
| 2,930,660 | 3/1960 | Dunn | 384/536 |
| 2,933,354 | 4/1960 | Primeau | 384/536 |
| 3,140,901 | 7/1964 | Young | 384/536 |
| 3,639,015 | 2/1972 | Maas | 384/536 |
| 3,961,829 | 6/1976 | Bowen et al. | 384/536 |

FOREIGN PATENT DOCUMENTS 1036487  8/1958  Fed. Rep. of Germany ...... 384/535
55-168428 12/1980  Japan .
58-90831  6/1983  Japan .

*Primary Examiner*—Stuart S. Levy
*Assistant Examiner*—Thomas R. Hannon
*Attorney, Agent, or Firm*—Schwartz, Jeffery, Schwaab, Mack, Blumenthal & Evans

[57] ABSTRACT

A center bearing supporting device adapted to support a center bearing mounted on a propeller shaft in the vicinity of a joint section. The center bearing supporting device consists of an annular elastic insulator connecting an inner tube mounted on the center bearing and an outer tube connected to a vehicle body. The intermediate major section of the insulator bends in its axial direction along its whole periphery to form an annular projection coaxial with the center bearing. The inner surface of the intermediate major section defines an annular groove. Additionally, an elastomeric stopper is secured to the center bearing and located contactable with the insulator. At least a part of the outer peripheral section of the stopper is inserted into the insulator annular groove.

10 Claims, 2 Drawing Figures

CENTER BEARING SUPPORTING DEVICE FOR PROPELLER SHAFT

BACKGROUND OF THE INVENTION

1. Field of the Invention

The present invention relates generally to a center bearing supporting device for supporting a center bearing which rotatably supports a connecting section of a plural-piece propeller shaft, and more particularly to such a center bearing supporting device adapted to effectively suppress the axial and radial vibrations of the propeller shaft.

2. Description of the Prior Art

It is well known that a longer propeller shaft consists of, for example, two pieces connected with each other, in which the joint section of the two pieces is rotatably supported by a center bearing. It is necessary for the center bearing to be elastically connected to a vehicle body in order to prevent axial and radial vibrations of the propeller shaft from being transmitted to the vehicle body. For this purpose, a center bearing supporting device has been proposed as disclosed, for example, in Japanese Utility Model Provisional (First) Publication No. 55-168428, in which an elastic member is securely interposed between an inner tube fitting around the periphery of a center bearing and an outer tube installed to a vehicle body. Additionally lip sections extend from the elastic member toward the axial direction of the propeller shaft. In such a center bearing supporting device, a larger axial relative displacement can be permitted between the inner and outer tubes. Additionally, a larger radial relative displacement is necessary between the inner and outer tubes, thereby enlarging the joint angle change of the propeller shaft joint section. This will increase the vibration exciting force of the propeller shaft.

In order to suppress the radial relative displacement between the inner and outer tubes, another center bearing supporting device has been proposed as disclosed in Japanese Utility Model Provisional (First) Publication No. 58-90831, in which an annular elastic stopper is provided to a device like the above-discussed one in a manner to bridge the inner and outer tubes. However, with this center bearing supporting device, the elastic stopper unavoidably serves to restrict the axial relative displacement between the inner and outer tubes, thereby making insufficient interruption of the axial vibration of the propeller shaft to the vehicle body.

SUMMARY OF THE INVENTION

A center bearing for a propeller shaft is supported by a center bearing supporting device according to the present invention. The center bearing supporting device is composed of an annular elastomeric insulator interposed between an inner tube mounted on the outer periphery of the center bearing and an outer tube connected to a vehicle body. The annular elastomeric insulator has an inner peripheral section secured to the inner tube, an outer peripheral section secured to the outer tube, and an intermediate section located between the inner and outer peripheral sections. The intermediate section bends in its axial direction along its whole periphery to form an annular projection coaxial with the center bearing. The inner surface of the bending intermediate section defines an annular groove. Additionally, an elastomeric stopper is disposed between the inner and outer tubes and located contactable with the insulator. At least a part of the elastomeric stopper is inserted into the annular groove.

Accordingly, during power transmission through the propeller shaft, axial vibration input from the propeller shaft to the center bearing is interrupted by the insulator and therefore prevented from being transmitted to the vehicle body. A greater axial relative displacement between the inner and outer tubes is enabled due to the bent structure of the insulator, and the elastomeric stopper is shaped so as not to restrict the axial relative displacement, thus effectively interrupting transmission of propeller shaft axial vibration to the vehicle body. Furthermore, radial vibration input from the propeller shaft to the center bearing is interrupted by the insulator under the action of the bending structure of the insulator, and therefore prevented from being transmitted to the vehicle body. If the radial relative displacement between the inner and outer tubes increases over a predetermined level, the elastomeric stopper restricts this radial relative displacement, thereby keeping the joint angular change of a joint section of the propeller shaft. This prevents the vibration exciting force of the propeller shaft from increasing. Such an effect can be stably obtained because at least a part of the stopper is inserted into the annnular groove of the insulator.

DETAILED DESCRIPTION OF THE INVENTION

Figure 1:
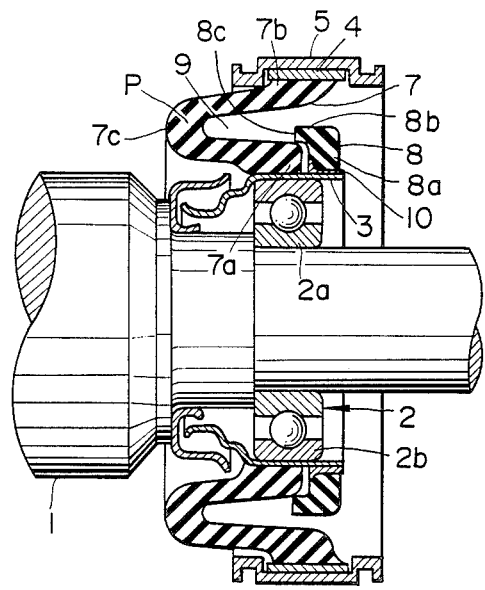
FIG. 1 is a vertical sectional view of a preferred embodiment of a center bearing supporting device in accordance with the present invention.
Figure 2:
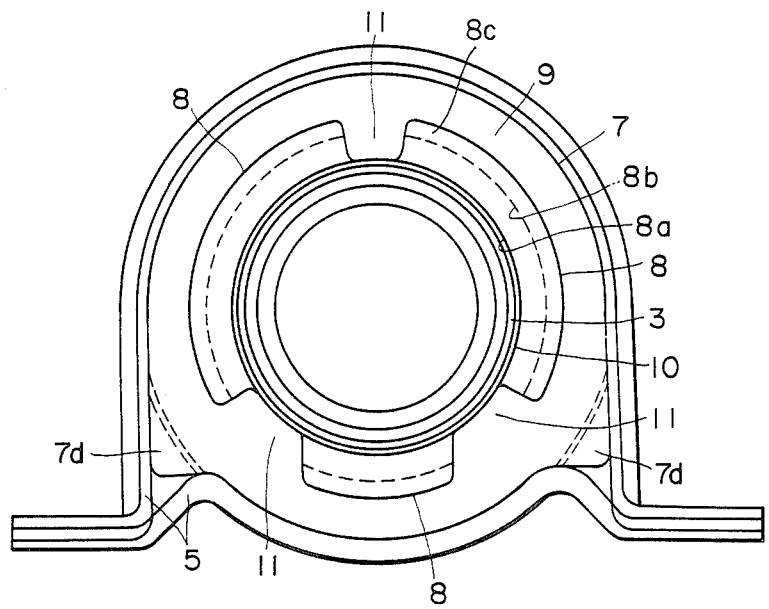
FIG. 2 is a side elevation of the center bearing supporting device of FIG. 1.

Referring now to FIGS. 1 and 2, there is shown a preferred embodiment of a center bearing supporting device for supporting a center bearing 2 for a propeller shaft 1, in accordance with the present invention. The propeller shaft 1 in this instance is for an automotive vehicle and of the two-piece type wherein two-piece shafts are connected through a joint (not shown) with each other to form the propeller shaft 1. The center bearing is mounted on an intermediate part of the propeller shaft 1 which is located near a joint section of the two-piece shaft though not shown. As shown, the inner race 2a of the center bearing is in contact with the outer periphery of the propeller shaft 1, so that the center bearing 2 rotatably supports the propeller shaft 1.

An annular inner tube 3 fits on the outer periphery of the outer race 2b of the center bearing 2. Additionally, an annular outer tube 4 is coaxially provided around the inner tube 3 and spaced from the inner tube 3. The outer tube 4 is tightly held by an annular cramp 5 and installed or securely connected to a vehicle body (not shown).

An annular insulator 7 is interposed between the inner and outer tubes 3, 4 to elastically connect the inner and outer tubes 3, 4. The insulator 7 is made of an elastomeric material such a rubber. The insulator 7 has an inner peripheral section 7a bonded to the outer peripheral surface of the inner tube upon valcanization, and an outer peripheral section 7b bonded to the inner peripheral surface of the outer tube 4 upon valcanization. The intermediate section 7c of the insulator 7 is bent in its axial direction (or in the left direction in FIG. 1) along the whole periphery thereof thereby to form an annular projection P having a U-shaped corss-section as shown in FIG. 1. It is to be noted that the intermediate section 7c forms a major part of the insulator 7. The inner surface of the intermediate section 7c defines an annular groove 9 extended in its axial direction, so that a space is formed between the inner and outer tubes 3, 4. The insulator 7 is integrally formed at its outer peripheral section 7b with at least one triangular projection 7d (two triangular portions shown in FIG. 2) covering the outer peripheral surface of the outer tube 4. The triangular projection 7d serves to prevent the insulator 7 from rotation.

Three arcuate stoppers 8 are disposed between the inner and outer tubes 3, 4 and made of an elastomeric material such as rubber. The arcuate stoppers 8 are bonded at their inner peripheral surfaces onto a common annular collar 10 upon valcanization. The collar 10 is secured to the outer peripheral surface of the inner tube 3. The outer peripheral section 8b of each stopper 8 projects toward the annular groove 9 to form an arcuate projection 8c. It is to be noted that at lease a part of the arcuate projection 8c is inserted into the annular groove 8 and located therein. In other words, at least a part of the arcuate projection is located between the inner and outer peripheral sections 7a, 7b of the insulator 7. The three arcuate stoppers 8 are concentrically arranged and spaced from adjacent stoppers to form a space 11 between the adjacent stoppers 8, in which the outer peripheral surfaces of the arcuate stoppers 8 are concentric as seen from FIG. 2.

The manner of operation of the thus arranged center bearing supporting device will be discussed hereinafter.

During power transmission from an engine (not shown) through the propeller shaft 1 to road wheels (not shown) of the vehicle, axial vibration input to the center bearing 2 is absorbed and interrupted by the bent intermediate section 7c of the insulator 7 and accordingly is prevented from being transmitted to the vehicle body. Additionally, the insulator bending intermediate section 7c makes possible a greater axial relative displacement between the inner and outer tubes 3, 4. In this connection, the stoppers 8 do not connect the inner and outer tubes 3, 4 and therefore never obstruct the above-mentioned axial vibration interruption action, thus effectively interrupting propeller shaft axial vibration.

Radial vibration input from the propeller shaft 1 to the center bearing 2 is absorbed and interrupted under the action of insultor bending intermediate section 7c and accordingly cannot be transmitted to the vehicle body. When radial relative displacement between the inner and outer tubes 3, 4 becomes larger over a predetermined level, the radial relative displacement is restricted under the action of the stopper 8 in such a manner that the arcuate projection 8c of the stopper 8 is brought into contact with the inner surface of the insulator intermediate section 7c. Thus, vibration exciting force of the propeller shaft 1 is prevented from becoming greater. It is to be noted that this effect can be stably obtained by the fact that the arcuate projections 8c of the stoppers 8 are inserted into the insulator annular groove 9.

During such action being made, the triangular projections 7d of the insulator 7 engages with curved sections (no numerals) of the cramp 5, thereby maintaining the insulator 7 and the attached annular collar 10. Accordingly the stoppers 8, which are also attached to the collar 10 are maintained at predetermined rotational positions relative to the cramp 5. As a result, the space 11 between the adjacent stoppers 8 is prevented from being displaced to a rotational position lying along a radial direction where a larger radial relative displacement between the inner and outer tubes is made, thus effectively obtaining the function of the stoppers 8. It will be understood that the insulator 7 and stopper 8 are formed separate from each other and therefore production thereof are facilitated.

What is claimed is:

1. A center bearing supporting device for supporting a center bearing for a propeller shaft, said device comprising:
    an inner tube mounted on outer periphery of the center bearing;
    an outer tube connected to a vehicle body;
    an annular elastomeric insulator interposed between said inner and outer tubes and having an inner peripheral section secured to said inner tube, and outer peripheral section secured to said outer tube, and an intermediate section located between said inner and outer peripheral sections, said intermediate section bending in its axial direction along its whole periphery to form an annular projection coaxial with the center bearing, inner surface of said bending intermediate section defining an annular groove; and
    an elastomeric stopper disposed between said inner and outer tubes, said stopper being independent from said insulator and generally L-shaped in cross section, said stopper being positioned so as to have an inner peripheral section secured to said inner tube and an outer peripheral section forming a projection, a part of which is inserted into said annular groove and contactable with said inner surface of said insulator which defines said annular groove.

2. A center bearing supporting device as claimed in claim 1, wherein said insulator intermediate section has generally U-shaped cross-section.

3. A center bearing supporting device as claimed in claim 1, wherein said stopper is securely connected to the center bearing.

4. A center bearing supporting device as claimed in claim 1, wherein e each of said insulator and stopper are made of rubber.

5. A center bearing supporting device as claimed in claim 1, wherein said stopper includes a plurality of stoppers concentrically arranged and disposed coaxial with the center bearing.

6. A center bearing supporting device as claimed in claim 5, wherein each stopper is arcuate and extends along outer periphery of said inner tube.

7. A center bearing supporting device as claimed in claim 5, wherein said stopper inner peripheral section is directly secured to a collar secured to said inner tube, and said projection is an arcuate projection, a part of which is inserted into said annular groove.

8. A center bearing supporting device as claimed in claim 5, wherein a space is formed between adjacent stoppers.

9. A center bearing supporting device as claimed in claim 8, further comprising means for preventing said insulator from rotation relative to a cramp by which said outer tube is supported.

10. A center bearing supporting device as claimed in claim 9, wherein said insulator rotation preventing means includes a projection integral with said insulator and engaging with a projection of the cramp.

* * * * *